Patented May 19, 1936

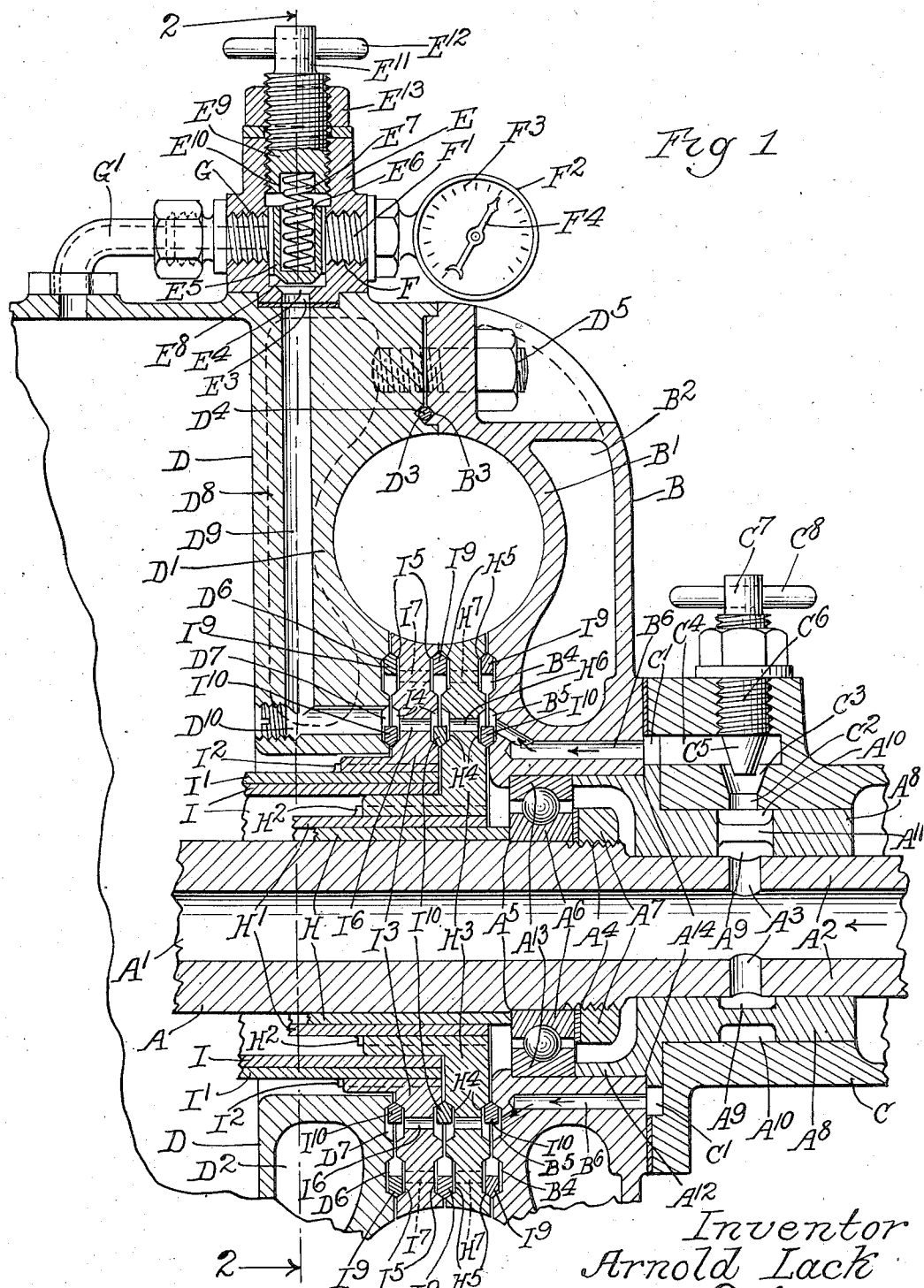

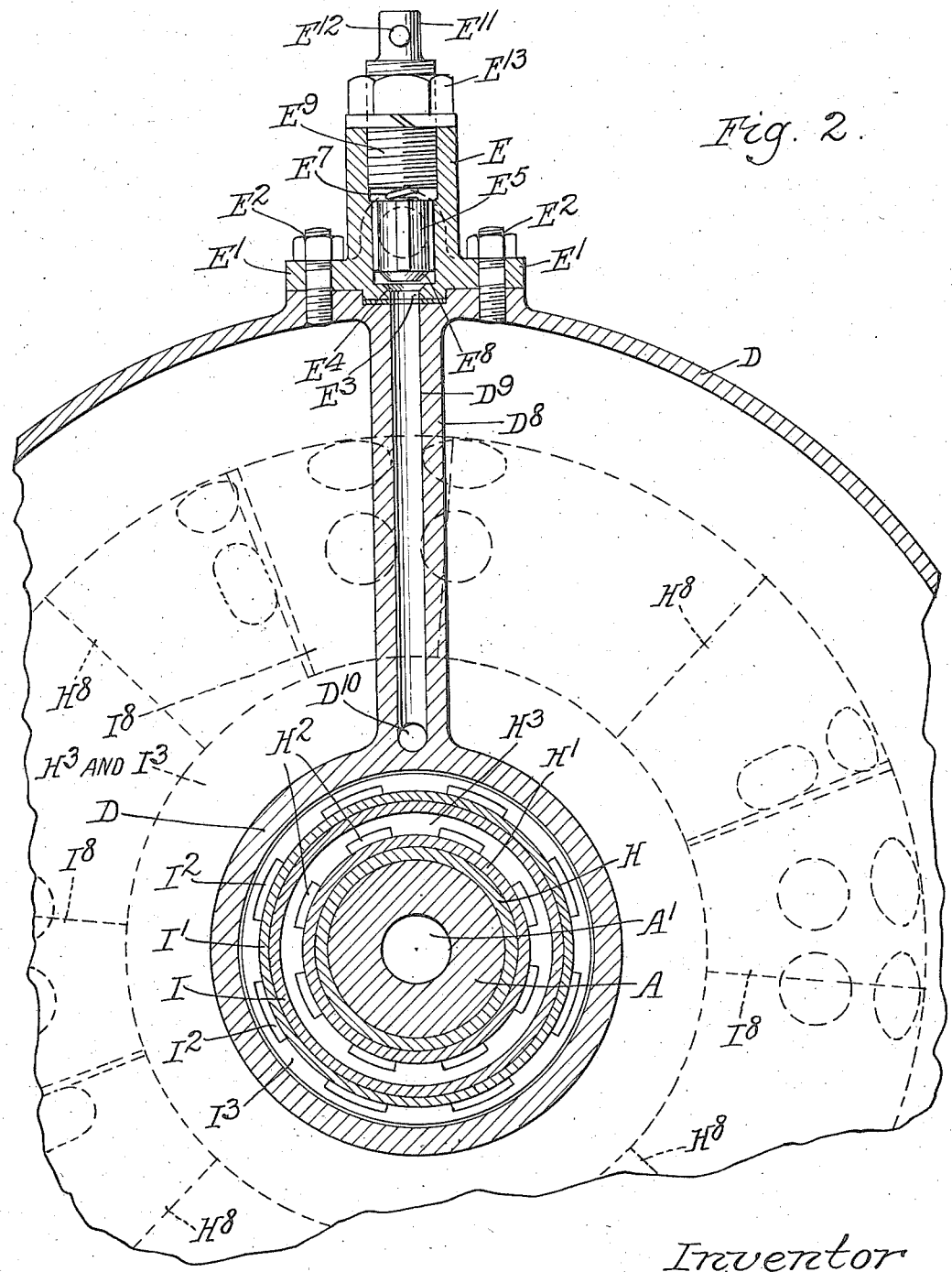

2,041,192

UNITED STATES PATENT OFFICE 2,041,192

LUBRICATING AND COOLING SYSTEM

Arnold Lack, Chicago, Ill., assignor to H. H. Shockey, Chicago, Ill.

Application August 18, 1933, Serial No. 685,671

10 Claims. (Cl. 184—6)

This invention relates to a lubricating and cooling seal for moving parts. In the form here shown it is applied to a rotary engine or compressor in which one or more pistons are mounted upon one or more carriers, the carriers themselves forming a part of the cylinder wall.

It is one object of the present invention to provide means for lubricating the carriers, for cooling them and for preventing leakage from the cylinder past them.

Another object is to provide adequate lubrication and cooling for the sealing means which, while separate from the cylinder, form part of the means for preventing escape from the cylinder. Such sealing means usually consist of rings and it is, therefore, one object of the invention to provide lubricating and cooling means for said rings or other sealing means. Another object of the invention is to provide in connection with means for lubricating and cooling the seals a quantity and pressure control means for controlling the quantity and pressure of lubricant and cooling liquid.

Other objects will appear from time to time in the specification and claims.

The invention is illustrated more or less diagrammatically in the accompanying drawings, wherein:—

Figure 1 is a section through the toric cylinder of a rotary engine showing the housing, the piston carriers, the seals, a part of the lubricating system and the control and pressure measuring means.

Figure 2 is a section taken partially at line 2—2 of Figure 1 and illustrating portions of the engine.

Like parts are designated by like characters throughout the specification and drawings.

The cooling, lubricating and sealing system here shown is in the present instance applied to a rotary engine in which there is a toric cylinder, in which pairs of pistons reciprocate and move about the cylinder. The system might be applied to engines of other sorts, or to compressors, internal combustion or steam engines, and is not limited to the particular association with the rotary engine here shown.

In the engine here shown A is a shaft, hollow as at $A^1$ to provide a passage for the lubricating and cooling fluid. It is reduced as at $A^2$ and one or more lubricant passages or ducts $A^3$ pass from the interior to the exterior of the shaft. The shaft is threaded as at $A^4$ and may be provided with a shoulder $A^5$. The inner race $A^6$ of an anti-friction bearing is positioned against the shoulder $A^5$ and on its opposite end is held in place by a nut $A^7$ mounted on the threaded portion $A^4$. $A^8$ is a lubricating ring positioned about the shaft. It may act as a bushing or bearing for the shaft. It is provided with a plurality of circumferential lubricating grooves $A^9$, $A^{10}$ which are positioned respectively on the interior and the exterior of the ring. They are connected by any suitable number of ducts $A^{11}$ which pass through the ring. An annular inward extension $A^{12}$ is formed on the ring $A^8$ and contacts the outer ball race $A^{13}$ of the ball bearing. A shoulder $A^{14}$ may be formed on the inner side of the ring $A^8$ and serves as a positioning shoulder.

B is a housing member shaped as at $B^1$ to form a portion of the cylinder wall. It may be provided with a cooling jacket or chamber $B^2$. It is grooved at $B^3$ to receive a packing material and is provided with one or more sealing grooves $B^4$, $B^5$, to receive packing and sealing rings as will be described in greater detail below. One or more lubricating ducts $B^6$ are formed in the member B and they extend to the groove $B^5$.

C is a second housing member surrounding the shaft and the ring $A^8$ and abutting against the housing B as shown in Figure 1. At its inner end it has an annular groove $C^1$ formed in it which groove extends preferably entirely about its inner margin and is in register with the lubricant ducts $B^6$ in the member B. $C^2$ is a passage formed in the member C and communicating with the groove $A^{10}$ in the ring $A^8$. It is preferably enlarged towards its inner end to provide a valve seat $C^3$ which communicates with a chamber $C^4$ formed within the housing member C and communicating with the annular groove $C^1$ cut in that member. $C^5$ is a valve adapted to be seated in the valve seat $C^3$. It may be provided with a threaded shank $C^6$ and with a portion $C^7$ which extends outside of the housing C. A handle member $C^8$ may be inserted in the portion $C^7$ to permit rotation of the valve for adjustment.

D is an additional housing member shaped to form a portion of the cylinder as at $D^1$ and thus it co-operates with the housing B to form the major part of the cylinder. It may be provided with a cooling chamber or passage $D^2$. It is preferably grooved or otherwise formed at $D^3$ to receive the packing $D^4$ and it is fastened to the housing B by any suitable number of screws and bolts $D^5$ one of which is shown in Figure 1. The housing parts, of course, may be fastened together in any other suitable manner. The housing D is provided with lubricating and sealing grooves $D^6$, $D^7$ adapted to receive sealing rings or other sealing means as will be described below. An inwardly extending wall $D^8$ is formed in the housing D and is provided with a bore $D^9$. Adjacent its inner end the bore $D^9$ communicates with a laterally directed passage or duct $D^{10}$ which itself communicates with the groove $D^7$.

E is a valve housing provided with one or more laterally extending ears $E^1$ to receive screws and nuts $E^2$ by means of which it is fastened to the housing member D. The valve housing E is hollow and at its lower end it is ported as at $E^3$. The port terminates on its inner end in an inclined valve seat $E^4$. $E^5$ is a valve member. It is preferably hollow as at $E^6$ to receive part of a spring $E^7$ and provided with vanes or lands on its exterior. At its lower end the valve $E^5$ is beveled as at $E^8$ so that the valve may be seated in the seat $E^4$. The upper end of the valve housing E is closed by a threaded plug member $E^9$ which is hollowed as at $E^{10}$ on its inner end to receive a portion of the spring $E^7$. At its upper end the plug $E^9$ is reduced as at $E^{11}$ and may receive a handle member $E^{12}$ by means of which it may be turned for adjustment. A locking nut $E^{13}$ may be provided.

The valve housing E is provided at one side with a threaded perforation F adapted to receive the hollow stem $F^1$ of a pressure gauge $F^2$. Any suitable gauge may be used. Its details form no particular part of the present invention. The gauge here shown is in communication with the interior of the valve housing E and includes a dial $F^3$ with a pointer $F^4$. Any suitable pressure responsive means may be provided within the gauge.

The valve housing E is provided with an additional threaded opening G adapted to receive a fluid conduit $G^1$ which communicates with the lubricant circulating system in any manner suitable. The full details of the means for circulating the lubricant are not here shown. Any means may be used so long as lubricant is supplied and circulated in proper quantities and at the desired pressures.

It has been seen that the cylinder is made up largely of the members $B^1$ and $D^1$. The remainder of the cylinder wall is formed by the valve carriers which will now be described.

H is a sleeve positioned about the shaft A. $H^1$ is a second sleeve to which is splined as at $H^2$ a piston carrier $H^3$. This carrier may be provided with any desired number of grooves. As shown herewith it has two pairs of circumferential grooves, $H^4$, $H^4$, being the inner pair and $H^5$, $H^5$, being the outer pair. The grooves $H^4$ are connected to each other by one or more ducts $H^6$ and the grooves $H^5$ are connected by one or more ducts $H^7$. Several pistons $H^8$ $H^8$ are fastened to the carrier $H^3$. The details of this fastening are not shown as they form no essential part of the present invention. As shown in Figure 2, if that view were complete, there would be four pistons $H^8$ attached to the carrier $H^3$ and spaced equally about its circumference.

I is a lubricant sleeve positioned about the hub portion of the carrier $H^3$ as shown particularly in Figure 1. $I^1$ is a second sleeve which has splined to it as at $I^2$ a second piston carrier $I^3$. This carrier may be provided with any suitable number of grooves. In the form here shown it has two inner circumferential grooves $I^4$, $I^4$ and two outer circumferential grooves $I^5$, $I^5$. One or more ducts $I^6$ communicate between the grooves $I^4$ and one or more ducts $I^7$ communicate between the grooves $I^5$. The carrier $I^3$ has attached to it in any suitable manner a plurality of pistons $I^8$. The number of pistons $I^8$ are the same as the number of pistons $H^8$ so that there is thus a plurality of pairs of pistons. $I^9$, $I^9$ are sealing rings located in the grooves closest to the cylinder. The left hand ring $I^9$ as shown in Figure 1 is located in the grooves $D^6$ and $I^5$; the central ring $I^9$ is located in the grooves $I^5$ and $H^5$ and the right hand ring is located in the groove $H^5$, $B^4$. A second series of rings $I^{10}$ is located in the grooves farthest from the cylinder and the left hand ring as shown in Figure 1 is located in the grooves $D^7$, $I^4$; the central ring is located in the groove $I^4$, $H^4$ and the right hand ring as shown in Figure 1 is located in the groove $H^4$, $B^5$. Each of the rings as shown is flattened at one side and inclined on the opposite side to correspond to the shape of the groove within which it lies. The rings may, of course, have another shape but this shape has been found convenient and to assist in sealing. It will be noted that the rings closest to the cylinder have their inclined faces pointing toward it and that the rings farther from the cylinder have their inclined faces pointing away from the cylinder. The rings may be of any suitable design and are preferably so shaped that of their own elasticity they tend to assume and maintain the position shown in Figure 1. Springs or other means might be provided in the grooves so as to be effective upon the rings to hold them in the desired position. The hydraulic pressure of the cooling and lubricating fluid may also be useful in holding the rings in the proper location.

It will be realized that whereas I have herewith shown and described a practical operative device, nevertheless many changes might be made in the size, shape, number and disposition of parts without departing from the spirit of my invention and I wish, therefore, that my showing be taken as in a sense diagrammatic.

In particular, the cooling, sealing and lubricating means might be applied to a great variety of engines and compressors and other machines involving moving parts in which sealing, cooling and lubricating means are necessary and it is in no sense to be limited to the rotary machine here shown.

Further, the arrangement and design of the sealing rings and grooves and other parts might be almost infinitely varied and their number, proportion and location might be also almost infinitely varied.

The use and operation of my invention are as follows:

As shown the invention is applied to a rotary engine in which there is a toric cylinder and in which there are pairs of pistons arranged on two carriers so that pairs of pistons reciprocate toward and from each other and as a whole move about the toric cylinder. The pistons are mounted on carriers which include sleeves about the engine shaft which may be fastened to any suitable gearing not here shown, and which also include generally disk-like members which carry the pistons. These disk-like members, as shown particularly in Figure 1, form a part of the cylinder wall. In the form shown the disk portions of the carriers move with respect to each other and with respect to the fixed portions of the cylinder walls $B^1$ and $D^1$, having a combined oscillating and rotary motion. There is thus friction between all of these parts. Pressure within the cylinder, of course, tends to leak past the piston carrying discs and heat is present in the engine either as a result of combustion within the engine or as a result of friction or as a result of compression or from all of these or other causes, and it is necessary, therefore, to provide cooling in addition to lubrication and sealing. This is in part accomplished in the present invention by the sealing rings and by the flow of lubricant which acts not only as a lubricating fluid but as a cooling fluid, to cool the seals and associated parts and to lubricate them. The lubricant control and the pressure gauge are provided so that the quantity and pressure of lubricant and cooling liquid may at all times be known and may be under control. This arrangement can be applied to compressors and to engines of different types.

It will be assumed that the lubricant is moving in the direction of the arrows shown in Figure 1. The means for furnishing the lubricant are not shown. Usually a pump driven by the engine itself is satisfactory and it supplies and circulates lubricant in sufficient quantities and at sufficient pressures. The quantity of lubricant which will reach the piston carriers and the sealing rings in a given time is determined by the seating of the valve $C^5$. The lubricant passes from the hollow $A^1$ of the shaft through the ports $A^3$ to the lubricant groove $A^9$ and thence through the ducts $A^{11}$, the groove $A^{10}$, the port $C^2$, past the valve $C^3$ and through the hollow $C^4$, to the ring $C^1$. Lubricant moves thence through the ducts $B^6$ to the right hand groove $B^5$ as shown in Figure 1. It may flow from that to the right hand groove $B^4$ and so past the sealing ring $I^9$ to lubricate the cylinder. Some of the lubricant will also pass through some of the various ducts $H^6$ and $I^6$ to lubricate the other grooves and the other rings and the various moving surfaces of the engine. The lubricant which passes through this system will pass thence through the duct $D^{10}$ and the passage $D^9$ to the interior of the valve housing E. The passage of fluid into the valve housing E is determined by the setting of the valve $E^5$ which can be adjusted by setting the member $E^9$ by means of the handle $E^{12}$. The spring $E^7$ is provided so that in case of excessive pressures the valve may yield to permit escape of fluid without breaking or damage to any of the parts.

Since the pressure gauge is in free communication with the interior of the valve housing E, pressure within that portion of the system will at all times be indicated on the pressure gauge. From the valve housing E the lubricant moves through the pipe $G^1$ in any suitable manner. It may move directly to an oil sump or to a cooling device and may move thence to the pump or other means for recirculating it. The particular details of the means for cooling and circulating the fluid form no essential part of the present invention.

The circulation of the fluid described above serves to lubricate and cool and exerts also a certain amount of pressure on the sealing rings to increase their sealing effect. The valve $C^5$ provides for the governing of the quantity of fluid passing and the valve $E^5$ provides for cooling or governing pressure upon the fluid and the pressure gauge provides means for determining this pressure at all times.

I claim:

1. In combination, a fixed member forming part of a cylinder wall and a moving member forming part of said cylinder wall, means for lubricating and sealing, comprising a mechanical sealing part interposed between the moving member and the fixed member, and a fluid passage communicating with said members to conduct fluid to said members, means for controlling the quantity of fluid admitted to said members and a second means for controlling the discharge of fluid from said passages whereby the pressure of the fluid within said passages is regulated.

2. In combination, a fixed member forming part of a cylinder wall and a moving member forming part of said cylinder wall, means for lubricating and sealing, comprising a fluid passage through said members and a mechanical sealing part interposed between the moving member and the fixed member, and a fluid passage communicating with said members to conduct fluid to said members, means for controlling the quantity of fluid admitted to said members and a second means for controlling the discharge of fluid from said passages whereby the pressure of the fluid within said passages is regulated.

3. In combination, a fixed member forming part of a cylinder wall and a moving member forming part of said cylinder wall, means for lubricating and sealing, comprising a mechanical sealing part interposed between the moving member and the fixed member, and a fluid passage communicating with said members to conduct fluid to said members, a valve for controlling the quantity of fluid admitted to said members and a second valve for controlling the discharge of fluid from said passages whereby the pressure of the fluid within said passages is regulated.

4. In combination, a fixed member forming part of a cylinder wall and a moving member forming part of said cylinder wall, means for lubricating and sealing, comprising a fluid passage through said members and a mechanical sealing part interposed between the moving member and the fixed member, and a fluid passage communicating with said members to conduct fluid to said members, a valve for controlling the quantity of fluid admitted to said members and a second valve for controlling the discharge of fluid from said passages whereby the pressure of the fluid within said passages is regulated.

5. In combination, a cylinder wall, a plurality of moving members contacting each other and the cylinder wall and forming part of the cylinder wall, and means for lubricating and sealing said members comprising ring receiving parts in the contacting, relatively moving members, sealing rings in said ring receiving parts and a fluid circulating system including fluid passages communicating with said ring receiving parts, whereby fluid is supplied under pressure to said relatively moving members, and means for controlling the quantity of fluid circulated and a second means for controlling the pressure of fluid.

6. In combination, a cylinder wall, a plurality of moving members contacting each other and the cylinder wall and forming part of the cylinder wall, and means for lubricating and sealing said members comprising ring receiving parts in the contacting, relatively moving members, sealing rings in said ring receiving parts and a fluid circulating system including fluid passages communicating with said ring receiving parts, whereby fluid is supplied under pressure to said relatively moving members, and means for controlling the quantity of fluid circulated and a second means for controlling the pressure of fluid within said ring receiving parts.

7. In combination, a cylinder wall, a plurality of moving members contacting each other and the cylinder wall and forming part of the cylinder wall, and means for lubricating and sealing said members comprising ring receiving parts in the contacting, relatively moving members, sealing rings in said ring receiving parts and a fluid circulating system including means for circulating fluid under pressure and fluid passages communicating with said rings and said ring receiving parts, whereby fluid is supplied under pressure to said relatively moving members, to said rings and to said ring receiving parts, and means for controlling the quantity of fluid circulated and a second means for controlling the pressure of fluid.

8. In combination, a cylinder wall, a plurality of moving members contacting each other and the cylinder wall and forming part of the cylinder wall, and means for lubricating and sealing said members comprising ring receiving parts in the contacting, relatively moving members, sealing rings in said ring receiving parts, and a fluid circulating system including means for circulating fluid under pressure and fluid passages communicating with said rings and said ring receiving parts, whereby fluid is supplied under pressure to said relatively moving members, to said rings and to said ring receiving parts, and means for controlling the quantity of fluid circulated and a second means for controlling the pressure of fluid upon said rings and within said ring receiving parts.

9. In combination in a pressure sealing system, a cylinder and a member mounted to move with relation thereto and to form a portion of the cylinder wall, grooves in the moving member and cooperating grooves in the cylinder, a sealing ring positioned partly in the groove in the cylinder and partly in the groove in the movable member and means for furnishing lubricating and sealing fluid to said groove and ring, a source of fluid under pressure, a valve to regulate the quantity of fluid supplied to said grooves and a second valve to control the discharge of fluid from said grooves.

10. In combination in a pressure sealing system, a cylinder and a member mounted to move with relation thereto and to form a portion of the cylinder wall, grooves in the moving member and cooperating grooves in the cylinder, a sealing ring positioned partly in the groove in the cylinder and partly in the groove in the movable member and means for furnishing lubricating, cooling and sealing fluid to said groove and ring, a source of fluid under pressure, means for cooling said fluid, a valve to regulate the quantity of fluid supplied to said grooves and a second valve to control the discharge of fluid from said grooves.

ARNOLD LACK.